Inventors
Peter L. Loewe
Eugene L. Boyce
by Parker Slater
Attorneys.

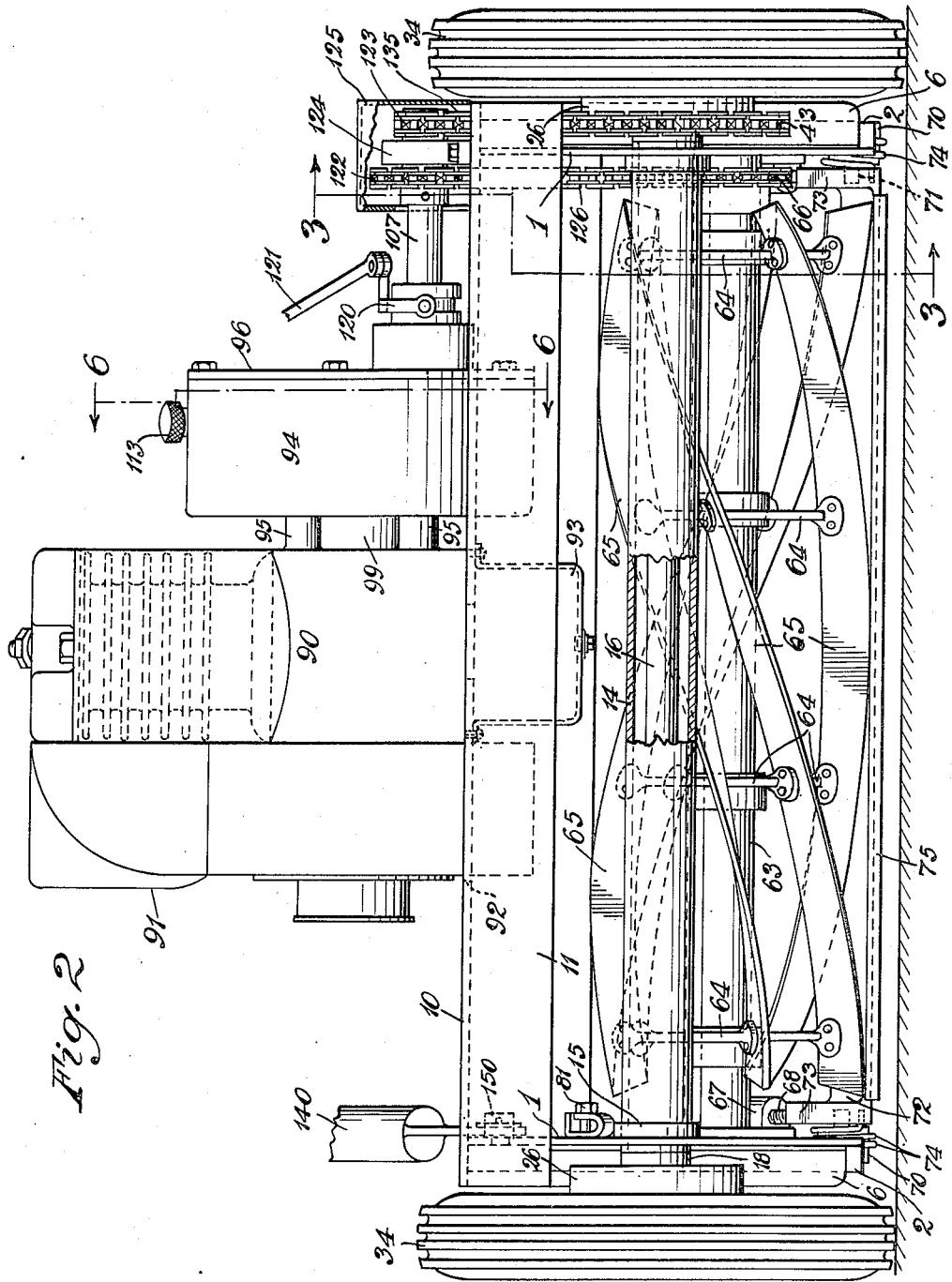

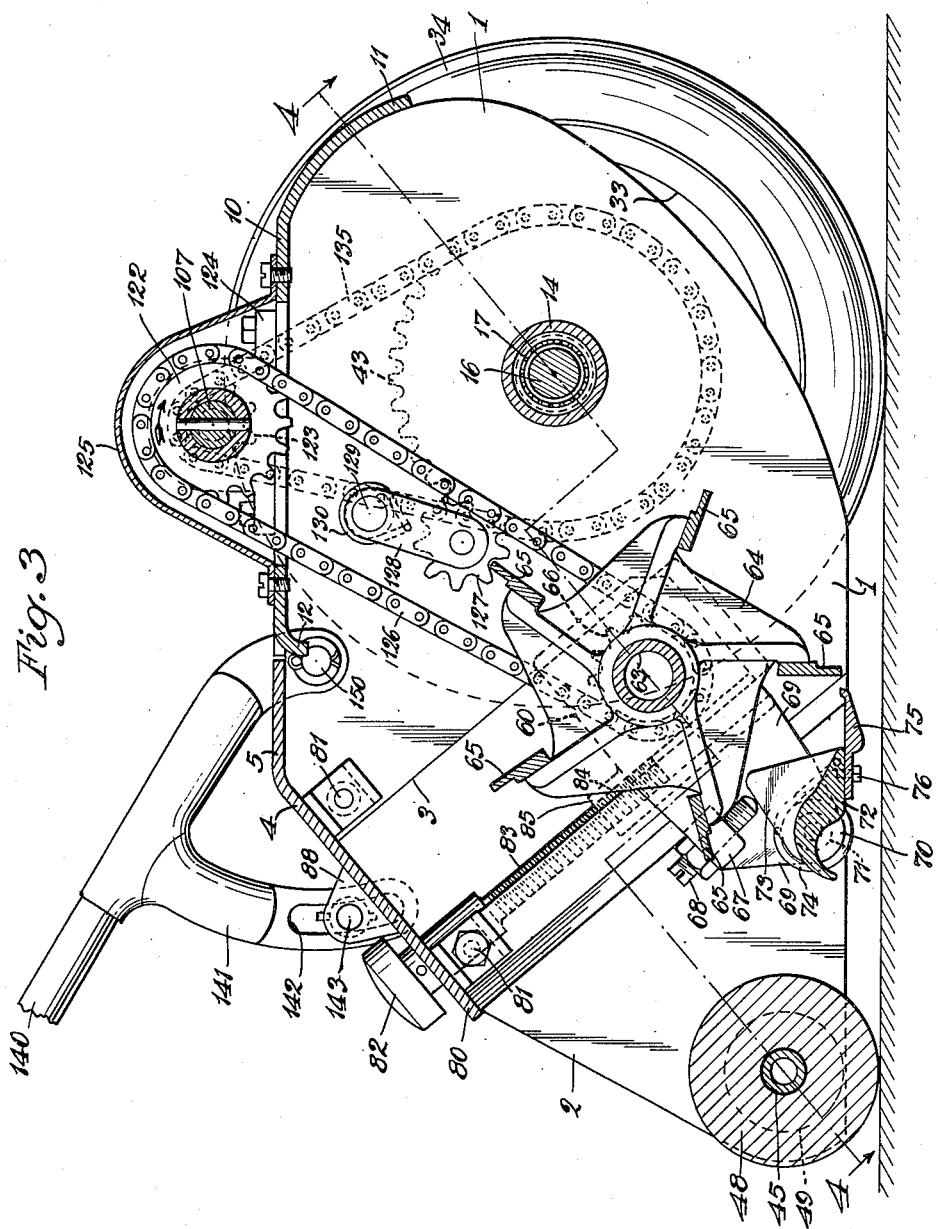

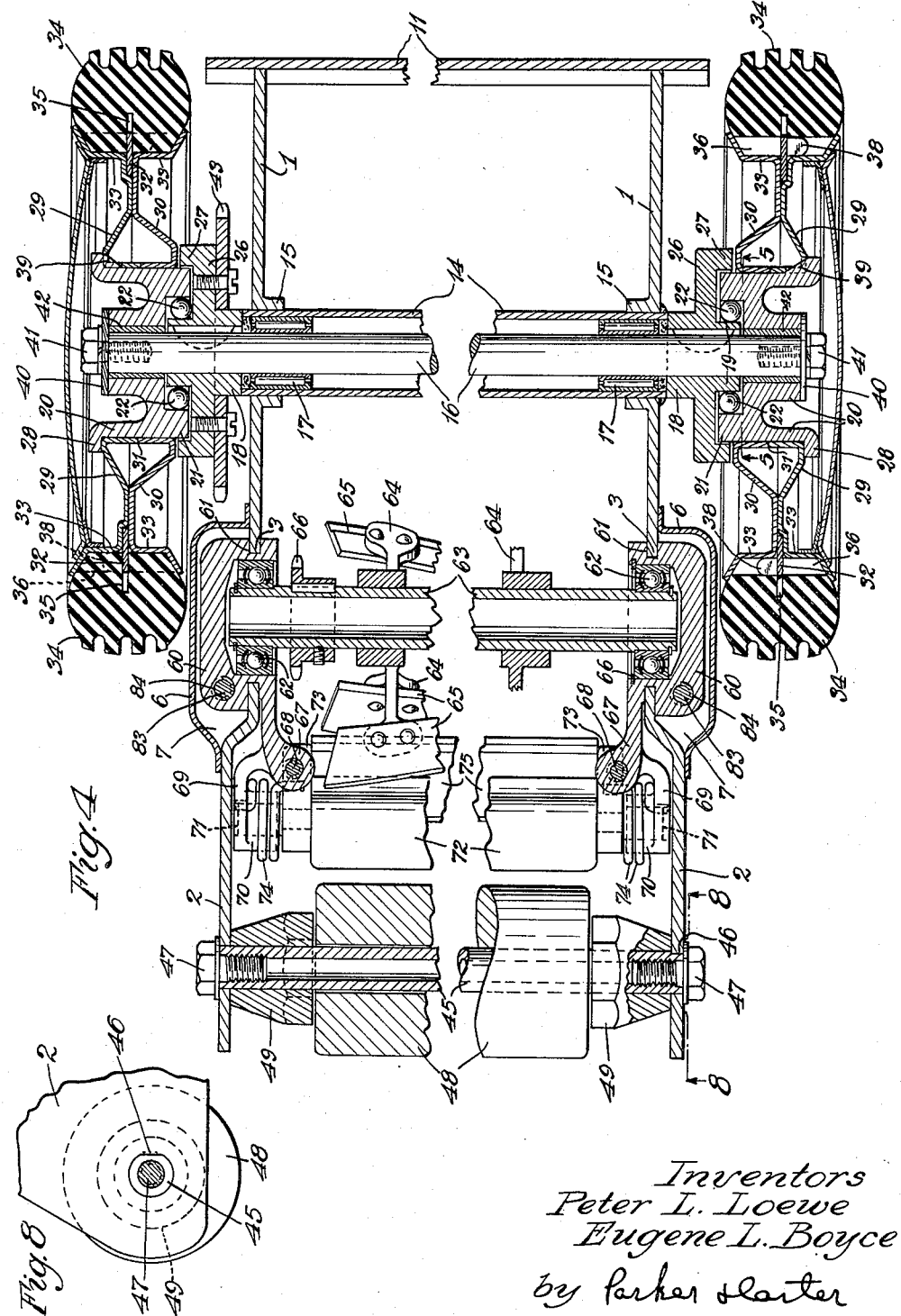

Inventors
Peter L. Loewe
Eugene L. Boyce
by Parker & Carter
Attorneys

Patented Apr. 3, 1951

2,547,401

UNITED STATES PATENT OFFICE 2,547,401

LAWN MOWER WITH REMOVABLE REEL

Peter L. Loewe and Eugene L. Boyce, Chicago, Ill., assignors, by mesne assignments, to Pioneer Gen-E-Motor Corporation, Chicago, Ill., a corporation of Delaware Original application April 8, 1944, Serial No. 530,102. Divided and this application October 27, 1944, Serial No. 560,575

7 Claims. (Cl. 56—249.5)

Our invention relates to an improvement in lawn mowers and driving means therefor.

One purpose of the invention is to provide an improved lawn mower chassis.

Another purpose is to provide an improved cutting unit or assembly for lawn mowers, including a rotary cutter and cutter bar.

Another purpose is to provide a lawn mower in which the cutter assembly is unitarily and readily removable from the lawn mower chassis.

Another purpose is to provide improved driving means for a motor operated lawn mower.

Another purpose is to provide a motor driven lawn mower having a low vertical clearance.

Another purpose is to provide an improved wheel assembly for lawn mowers.

Another purpose is to provide an improved ratchet connection for lawn mower wheels.

Another purpose is to provide an improved lawn mower wheel and tire and means for preventing tilting of the tire.

Another purpose is to provide improved handle means for a motor driven lawn mower.

Another purpose is to provide an improved motor and drive assembly and support for lawn mowers.

Other purposes will appear from time to time throughout the course of the specification and claims.

The present application is a division of our co-pending application Serial No. 530,102, filed April 8, 1944, which issued on June 19, 1945, as Patent No. 2,378,488.

Our invention is illustrated more or less diagrammatically in the accompanying drawings, wherein—

Figure 2 is a front elevation with parts broken away;

Figure 3 is a section on the line 3—3 of Figure 2 on an enlarged scale;

Figure 4 is a section on the line 4—4 of Figure 3;

Figure 8 is a section on the line 8—8 of Figure 4.

Like parts are indicated by like characters throughout the specification and drawings.

Figure 1:
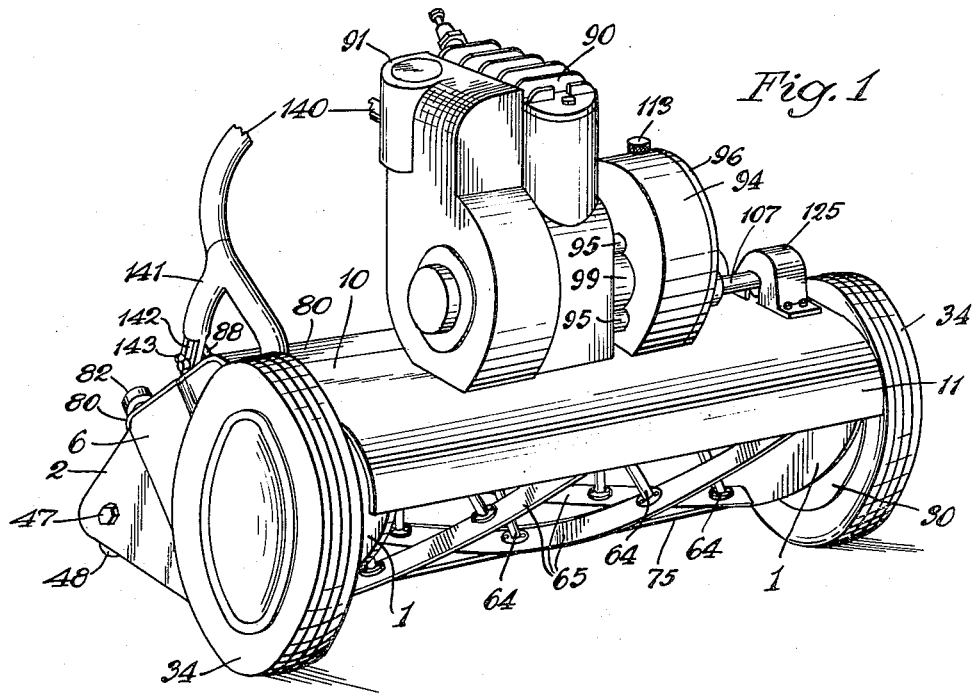
Figure 1 is a perspective view.

Referring to the drawings, the chassis structure includes a pair of side plates 1. Each said side plate has a rearwardly outwardly flared part 2. Each side plate is provided with a wide slot or cut away portion 3, having parallel walls, the walls or edges being upwardly and rearwardly inclined toward an inclined edge portion 4 which is inclined downwardly from the forward upper edge portion 5.

The slotted portion of each plate may be outwardly masked by any suitable sub-plate or outward projection 6, the opposite edges of which are secured to the outer face of the plate as shown for example in Figure 4. It will be observed that these outer plates 6 define with the adjacent masked portions of the plates 1, a pocket or space 7 which is open at the top.

The upper edges of the plates 1 are connected by a top plate 10, the forward edge of which is curved downwardly as at 11 to conform to the engaging portions of the front edges of the plates 1, as shown in Figure 3. This downwardly curved portion 11 of the plate 10 serves as a bumper or guard for the later described structure within the chassis. Note that the rearward edge of the plate 10 may be downwardly somewhat curved as at 12. The plates 1 are further connected by a tubular sleeve or strut 14, which is welded or otherwise secured to integral offset sleeves 15 extending inwardly from the plates 1. Rotatably mounted within the strut 14 is the wheel shaft or axle 16 which is shown as rotatable in any suitable bearings such as needle bearings 17.

Figure 5:
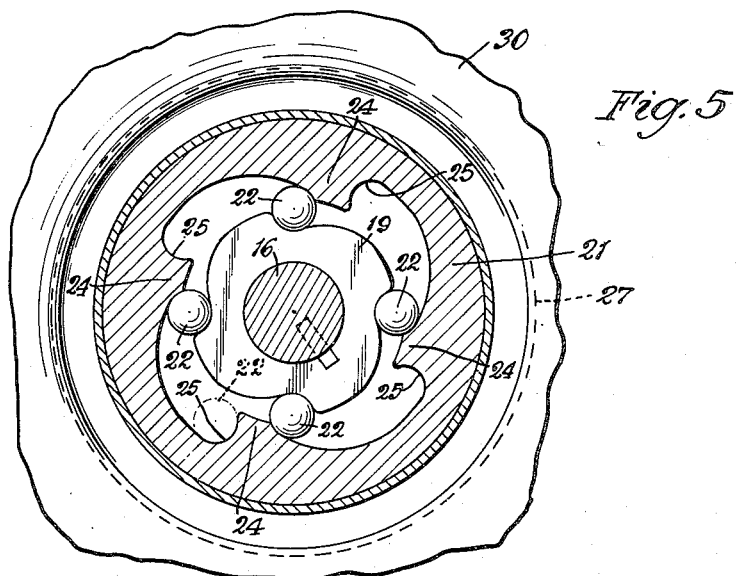
Figure 5 is a section on an enlarged scale on the line 5—5 of Figure 4.
Figure 7:
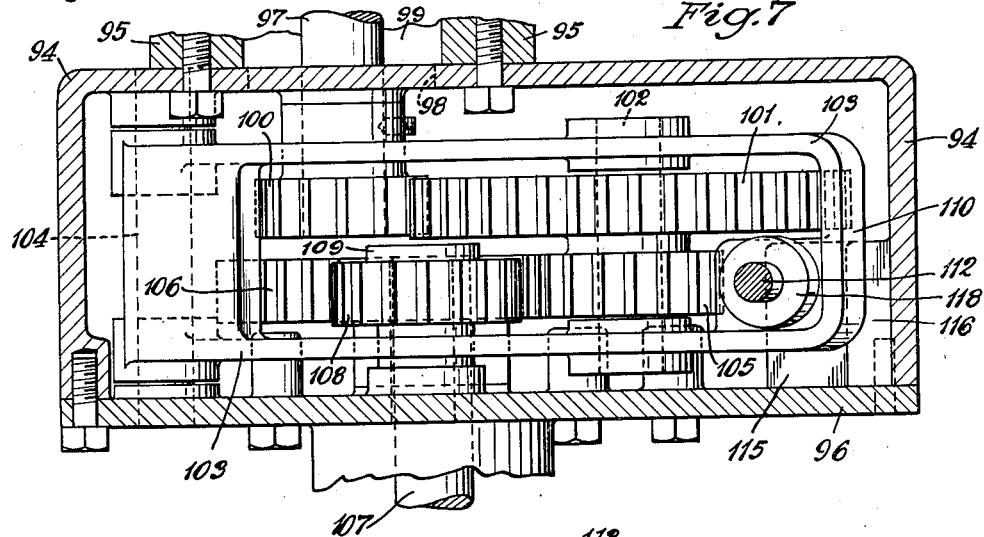
Figure 7 is a section on the line 7—7 of Figure 6.

Keyed to each end of the shaft 16 is a hub 18, one part of which as at 19, is formed to act as the inner ratchet member. The portion 19 is surrounded by an outer ratchet member 21 which forms part of the wheel hub 20, which is rotatable about the shaft 16, so far as is permitted by the opposed ratchet members and the balls 22. It will be noted from Figure 5 that when the parts are in the position in which they are shown at that figure and the shaft 16 and hub shaft are rotated in a clockwise direction, the balls 22 are in driving relationship with projections 24 of the outer ratchet member 21. A reversal of the direction of rotation of the shaft 16 will move the balls into the pockets 25 and permit relative rotation of the inner and outer ratchet members. The shaft hub 18 has a radially outwardly extending web 26 which terminates in a longitudinally outwardly extending flange 27 which partially surrounds the outer sprocket member 21. The wheel hub 20 has an outer flange 28. Surrounding the wheel hub and abutting against said flange 28 is a wheel web structure including separate web members 29 and 30 which are inwardly flared apart as shown in Figure 4 and have portions conforming to the exterior of the hub 20 with edges which abut as at 31. The outer portions of the webs 29 and 30 abut and are secured together in any suitable manner for example by welding. They are spaced apart to receive a tire engaging ring or sequence of members 32. They also have outwardly flared portions 33 which combine to form a tire trough adapted to receive the tire 34. This tire has a circumferentially extending slot 35 and a series of cross slots 36. Preferably the parts 33 extend upwardly about the sides of the tire 34 far enough to mask the ends of the transverse slots 36. The member or members 32 extend into the slot 35 and are provided with any suitable lateral projections or flanges 38 which extend into the cross slots 36. The web structure may be held against rotation in relation to the wheel hub 20 by any suitable interpenetration as at 39.

40 is any suitable end plate on the shaft 16 held by any suitable screw 41 to prevent outward displacement of the wheel structure. 42 is any suitable bushing or bearing about the shaft 16 for the wheel hub 20. One of the hub structures 18 and its web 26 may have secured thereto any suitable sprocket 43, whereby the wheel assembly may be driven from the drive structure which will later be described.

The rear ends or corners of the side plates 1 are further connected by a tubular member which, when in position, serves as an additional strut or support. We illustrate for example the tube 45, one end of which may be flattened as at 46 to prevent rotation of the tube when inserted into the side plate portions 2. If desired, the tube may be shouldered at each end so that it may be sprung in. The screws 47 in that event are effective to hold the side plates against such shoulders, and the tube can therefore act as a stiffening member and contribute to the strength and general rigidity of the chassis as a whole. 48 indicates a roller or rollers, it being understood that several rollers may be employed with any suitable spacers or washers thereupon. 49 are end spacers for spacing or centering the rollers or roller at the proper point between the side plate portions 2.

The cutter assembly is a unit which may be unitarily inserted in or removed from or adjustable in relation to the above described chassis. The assembly includes for example a pair of end members generally indicated at 60 which are slotted as at 61, to surround and slide in relation to the opposed edges of the slots 3 of the side plates. Mounted in each end member 60 is any suitable bearing structure, for example a sealed ball bearing assembly 62 in which rotates the shaft 63 which carries any suitable spiders or arms 64 to which are secured the cutter blades 65. The shaft 63 also carries a sprocket 66. We find it advantageous to anchor one of the bearing assemblies 62 in relation to one of the side members 60 thereby permitting the other assembly freedom of longitudinal movement in relation to the opposite side member 60. Such anchoring or securing means are indicated as at 66 in Figure 4.

Extending rearwardly from an inner portion of each of the side members 60 is a lug 67 adapted to receive any suitable adjusting screw and nut assembly 68. 69 is a web which may be unitary with the end member 60 and the lug 67 and which extends downwardly and is provided with an inwardly extending boss 70 apertured to receive a pin 71 of the cutter bar structure 72. The cutter bar structure has ears 73 which are normally upwardly urged against the ends of the adjusting screws 68 by any suitable means such as the coil spring 74, one end of which is anchored on the cutter bar and the other to the web 69. Thus the ear 73 will be yieldingly urged against the adjusting screws 68. The cutter bar proper 75 may be secured to the above-mentioned structure as at 76.

The above described structure can be slid as a unit into and out of the slots 3. It may also be readily adjusted toward and away from the surface on which the lawn mower is operating. We employ for example a top plate 80 which spans the upper edges of the side plates 1 and may be removably secured thereto in any suitable manner for example by bolts 81. Extending through said plate 80 at each end thereof is a manually adjusting and releasing element 82 having a screw threaded portion 83 which enters correspondingly screw threaded apertures in the end members 60 as at 84, in the bosses 85. Thus by rotating the members 82, the entire above described cutting assembly can be moved along the slots 3. If it is desired to remove the entire assembly, the securing bolts 81 are released and the entire structure is drawn upwardly out of the slots. We also illustrate handle securing lugs 88, the purpose of which will later appear.

Mounted on and supported on the transverse top plate 10 is any suitable motor structure generally indicated at 90, the details of which do not of themselves form part of the present invention. Any suitable fuel storage tank 91 may be employed and if necessary, the plate 10 may be recessed or apertured as at 92 to receive the lower portion thereof. 93 is an oil tank or pan for the motor which is shown as secured to the lower face of the top plate 10. It will be understood that if desired, the oil tank may be made unitary with the motor 90 and the top plate 10 may be cut away or recessed to receive it. 94 is a gear reduction box or housing which also may extend below the level of the top plate 10, which may be recessed or cut away to receive it. 95 are any suitable spacing lugs of the motor structure to which the box 94 may be secured. 96 is a removable end closure for the box 94. 97 indicates the motor shaft which extends through an aperture 98 in the side wall of the member 94. The lugs 95 may be connected with any suitable web 99 to protect the shaft. The shaft carries a drive pinion 100. The pinion 100 drives the large gear 101 on a shaft 102, which shaft is supported in a yoke or frame 103 pivoted as at 104. The gear 105, in mesh with the gear 106, on the shaft 107, is keyed in relation to the gear 101, to constitute a cluster gear. In mesh with the gear 106 is the idler 108 on the stub shaft or pin 109 herein shown as mounted on the side plate 96.

Figure 6:
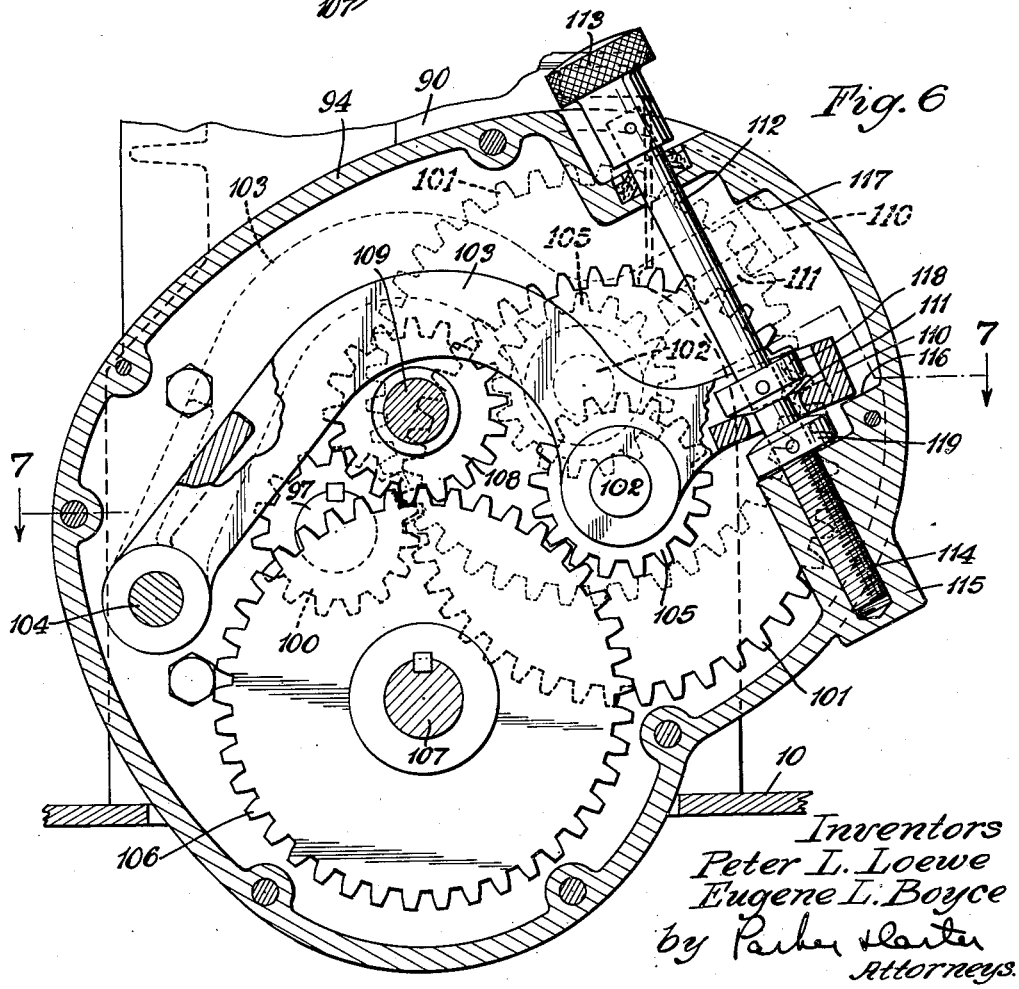
Figure 6 is a section on the line 6—6 of Figure 2 on an enlarged scale.

When a reversal of the direction of drive is desired, it may be obtained by shifting the yoke 103. The yoke 103 is shown in Figure 6 as having an extension 110, apertured as at 111 to receive an adjusting pin 112, having an external manually operable knurled head 113 and an inner portion 114 in screw threaded relationship with the boss 115 of the member 94. 116 is a limit stop formed in the wall 94 and 117 an opposite limit stop. The member 112 carries actuating collars 118, 119 secured thereto. It will be understood that when the parts are in the full line position in which they are shown in Figure 6, the idler is out of the line of drive. If the user rotates the head 113 sufficiently to move the parts to the dotted line position with the end of the yoke 103 against the stop 117, the pinion 105 is first disengaged from the gear 106 and is later engaged with the idler 108, which is thereby added to the line of drive. The result is a reversal in the direction of rotation of the driven shaft 107.

Any suitable clutch means, the details of which do not form part of the present invention, may be employed for clutching or de-clutching the shaft 107 from the driven gear 106.

120 is any suitable actuating yoke which may be operated by any suitable control rod 121. The shaft 107 carries two sprockets 122, 123 at opposite sides of the bearing 124 which supports the outer end of the shaft 107 within any suitable housing 125. The sprocket 122 through the chain 126 drives the cutter sprocket 66 and thus rotates the cutter. The chain is maintained under tension by the idler 127 on the arm 128 pivoted as at 129 and urged by the coil spring 130 against one bight of the chain 126. Thus regardless of variations in adjustment of the cutter assembly along the slots 3, the chain 126 is maintained under proper driving tension. The sprocket 123 through the chain 135 drives the wheel sprocket 43. Thus the rotary cutter and the wheels are simultaneously but separately driven by rotation of the shaft 107.

We may employ any suitable handle means but we illustrate for example a handle including a fork 140, each side of which is provided with a rearward adjusting extension 141 slotted as at 142 and provided with a thumb nut 143 which extends through the ear 88 on the plate 80. Thus the angle of the handle may be controlled. The forward ends of each fork of the handle are pivoted to the side plate 1 as at 150. The control rod 121 may extend to the upper end of the handle and may be mounted in any suitable manner not herein shown and may be provided with any suitable manually operable control member not herein shown. Also any suitable means for controlling the motor may be employed but is not herein shown, the details of which do not of themselves form part of the present invention.

It will be realized that whereas we have shown and described an operative structure, still many changes might be made in the size, shape, number and disposition of parts without departing materially from the spirit of our invention. We wish, therefore, that our showing be taken as in a sense diagrammatic and illustrative, rather than as limiting us to the precise showing.

The use and operation of our invention are as follows:

We provide a compact and efficient lawn mower structure which has a low vertical clearance. By recessing or aperturing the top cutting plate 10, we are able to drop the motor 90 somewhat lower and to have such parts as the oil pan 93 and the lower part of the gear box 94 extend to a level below that of the upper edges of the side plates 1. This provides a low clearance while still leaving the driving mechanism freely accessible.

We find it highly advantageous to provide a basic chassis of maximum strength and relative rigidity. This chassis includes side members such as the plates 1 herein shown, the cutting top plate 10, the wheel strut 14 and the rear roller tube 45. Thus when the device is assembled, a strong chassis is provided which is supported in predetermined relation to the surface over which the lawn mower moves by the tires 44 and the rear roller or rollers 48.

The cutter assembly is bodily removable from the chassis, a matter of great convenience in repair, for example dealers may carry duplicate cutter assemblies which may be sold and readily inserted, when the cutter assembly supplied with the lawn mower is worn out or broken. Service and repairmen may carry cutter assemblies for temporary loan so that the lawn mower as a whole need not be out of use during sharpening or repair.

When the user rotates the knobs 82 in order to adjust the cutter assembly toward and away from the supporting surface, no change of relationship results between the cutter bars 75 and the rotary cutter itself. The rotation of the knobs 82 and the consequent raising and lowering of the cutter assembly, does not change the relative angle between the cutting surface and the ground. When it is desired to change the relationship between bar and rotary cutter, it can be done by actuating the adjusting screw 67 which may be locked in any adjusted position by its associated lock nut. The spring 74 is effective to urge the cutter bar 75 as far toward the path of the cutting edges of the adjusting screw 68 will permit. This somewhat delicate adjustment is not affected by the adjustment of the cutter assembly as a whole along the slots 3. Also the spring thrust serves as a spring release when such a release becomes necessary. The idler 127 keeps the cutter driving chain 126 under proper tension at all adjustments. The fact that one of the bearing assemblies 62 is free to move in relation to one of the end members 60 prevents any locking or binding in the event of any slight misalignment or non-parallelism of the side plates 1.

All of the bearings employed both for the cutter assembly and for the wheels are sealed units which call for no oiling. The wheels do not need to be oiled. The wheel interiors are protected by the removable hub plates 20a. The ratchet structure does not call for lubrication.

When the user wishes to sharpen the blades, he may do so by reversing the cutter drive and moving the cutter blades in retrograde across the cutter bar 75, after having treated the cutter bar with any suitable abrasive. The reversal may be obtained by actuating the structure shown in detail in Figure 6. Rotation of the knob 113 may be employed to include the idler 108 in the line of drive and the result is the reversal in the direction of rotation of the cutter.

We claim:

1. In a lawn mower, a chassis, ground engaging tractor wheels rotatably mounted on said chassis, a ground engaging support rotatably mounted on said chassis, said wheels and support being adapted to support said chassis in predetermined and fixed relation to the surface over which the mower moves, a motor mounted on said chassis, a driving connection between said motor and said tractor wheels, a reel assembly adjustably mounted on said chassis for bodily movement toward and away from the surface over which the mower moves, and bodily upwardly removable from the chassis, said assembly including upwardly removable bearing end elements, a cutter bar adjustably mounted on said end bearing elements and a cutter reel rotatably mounted on said end bearing elements, means for bodily adjusting said end bearing elements toward and away from the surface over which the lawn mower moves, while maintaining a constant relationship between the axis of rotation of the reel and the location of the cutter bar, and a flexible driving connection between the motor and the reel.

2. The structure of claim 1 characterized by and including take-up means for maintaining a flexible driving connection between the motor and reel effective throughout the range of adjustment of the reel assembly in relation to the chassis.

3. The structure of claim 1 characterized by and including a driving assembly composed of a jack shaft, a plurality of sprockets on said jack shaft, a sprocket formed for rotation with one of said tractor wheels, a drive chain connecting one of said jack shaft sprockets with said tractor wheel sprocket, a sprocket mounted for unitary movement with the reel, and a drive chain connecting said reel sprocket with the other of said jack shaft sprockets.

4. In a lawn mower structure, a chassis including side members and substantially rigid connecting members extending between and connecting the side members, a pair of ground engaging tractor wheels rotatably mounted on said chassis for rotation about an axis fixed in relation to said side members, an additional rotatable support mounted between said side members and adapted, with the tractor wheels, to maintain said chassis in fixed relation to the surface over which it moves, a reel assembly mounted on said chassis for bodily movement along a predetermined path, said reel assembly including a rotary reel and a cutter bar, a motor on the chassis, a driving connection between the motor and the driving wheels, and a driving connection between the motor and the reel, said reel assembly having end members slidably mounted for movement upwardly and downwardly in relation to the opposite side members of the chassis, and being upwardly removable from the chassis, the driving connection between the motor and the reel being effective throughout a substantial range of adjustment of the reel assembly.

5. The structure of claim 4 characterized by and including a reel assembly having end bearing supports upon which said cutter bar is adjustably positioned and upon which said rotary reel is rotatably supported.

6. In a lawn mower structure, a chassis including side members and substantially rigid connecting members extending therebetween, a pair of ground engaging tractor wheels rotatably mounted on the chassis for rotation about an axis normally fixed in relation to the side members, an additional rotatable support mounted between the side members and adapted, with the tractor wheels, normally to maintain the chassis in fixed relation to the surface over which it moves, a reel assembly mounted on said chassis for bodily movement along a predetermined path, said assembly being upwardly bodily removable from the chassis, said reel assembly having end members slidably mounted on the side members of the chassis, and including a rotary reel and a cutter bar supported on said end members, a motor on the chassis, a driving connection between the motor and the driving wheels, and a driving connection between the motor and the reel effective throughout a substantial range of adjustment of the reel assembly in relation to the chassis.

7. The structure of claim 6 characterized by and including open-topped slots in the side members of the chassis, along which the end members of the reel assembly are slidably movable, and tensional adjusting and supporting members for the side members of the reel assembly mounted on and extending downwardly from an upper part of the chassis.

PETER L. LOEWE.
EUGENE L. BOYCE.

REFERENCES CITED

The following references are of record in the file of this patent:

UNITED STATES PATENTS

| Number | Name | Date |
| --- | --- | --- |
| 359,550 | Williams | Mar. 15, 1887 |
| 1,043,507 | Coldwell | Nov. 5, 1912 |
| 1,138,730 | Coldwell | May 11, 1915 |
| 1,412,583 | Vanette | Apr. 11, 1922 |
| 1,674,847 | Watson | June 26, 1928 |
| 1,703,521 | Dremel | Feb. 26, 1929 |
| 1,767,510 | Carlson | June 24, 1930 |
| 2,013,597 | Blydenburgh | Sept. 3, 1935 |
| 2,133,512 | Herge | Oct. 18, 1938 |
| 2,160,259 | Cooper | May 30, 1939 |
| 2,220,705 | Burckes | Nov. 5, 1940 |
| 2,285,230 | Roberton | June 2, 1942 |
| 2,292,580 | Moyer et al. | Aug. 11, 1942 |
| 2,298,135 | Klein | Oct. 6, 1942 |
| 2,300,461 | O'Dell et al. | Nov. 3, 1942 |
| 2,329,952 | Speiser | Sept. 21, 1943 |
| 2,335,054 | Godwin | Nov. 23, 1943 |
| 2,378,488 | Loewe et al. | June 19, 1945 |

FOREIGN PATENTS

| Number | Country | Date |
| --- | --- | --- |
| 104,826 | Sweden | June 23, 1942 |